(No Model.) 2 Sheets—Sheet 2.
A. R. MALLORY.
PLOW.
No. 395,573. Patented Jan. 1, 1889.
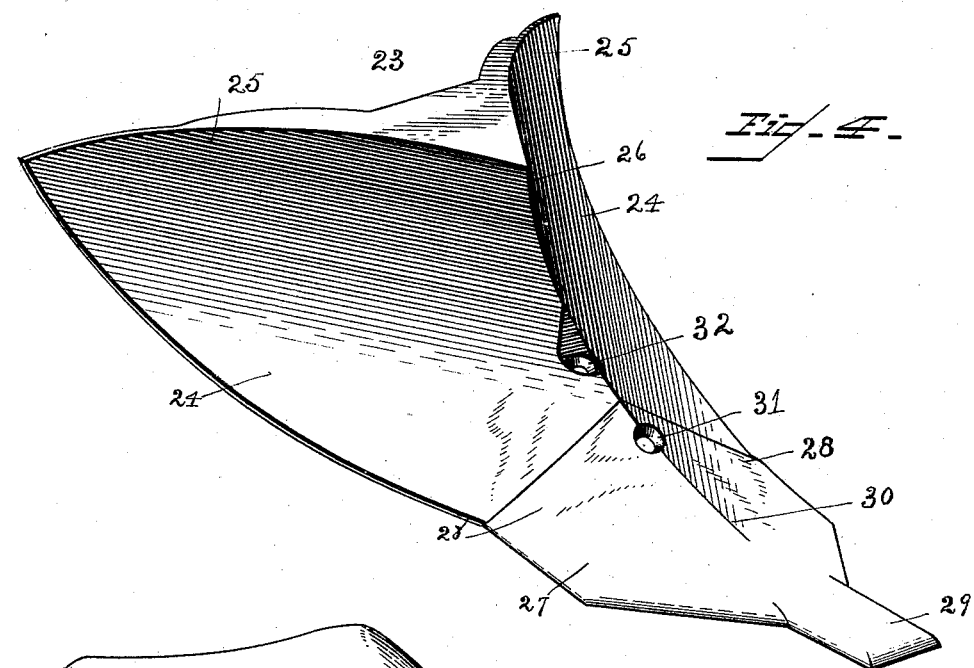
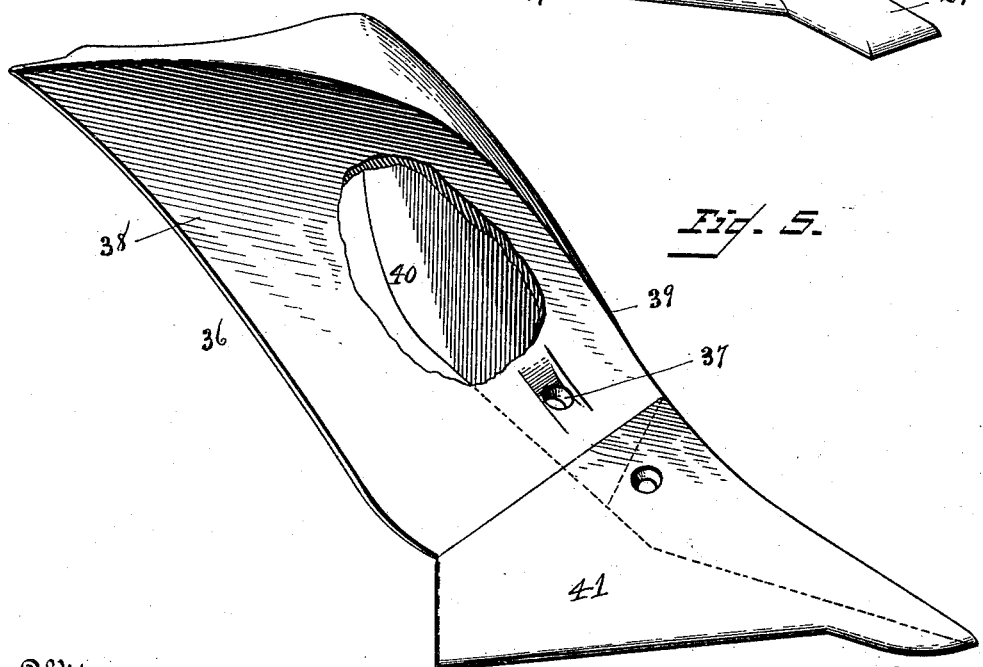
Witnesses
Inventor,
Alonzo R. Mallory,
By his Attorney
Chas. J. Gooch

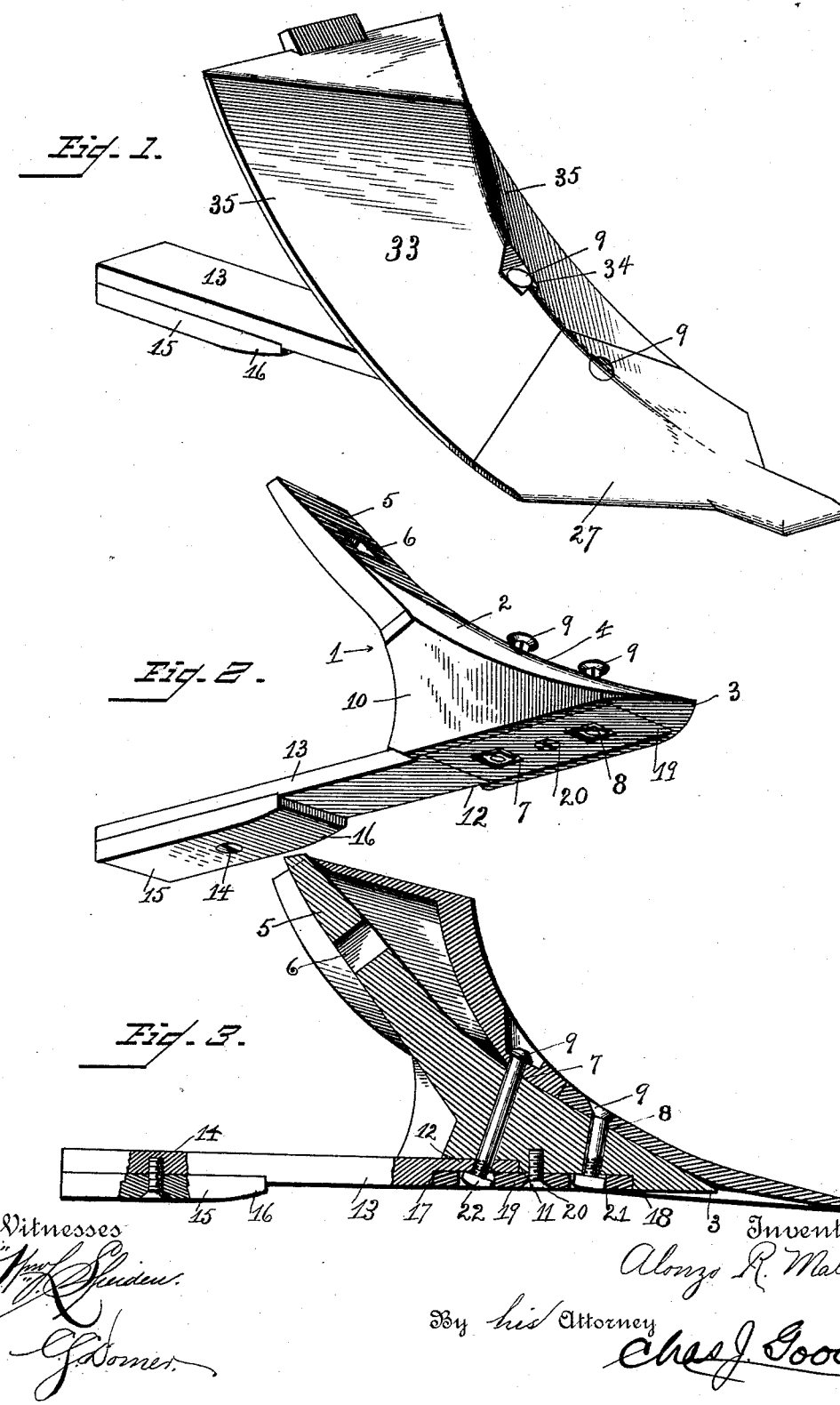

UNITED STATES PATENT OFFICE.

ALONZO R. MALLORY, OF MADISON, GEORGIA.

PLOW.

SPECIFICATION forming part of Letters Patent No. 395,573, dated January 1, 1889.

Application filed June 20, 1888. Serial No. 277,627. (No model.)

*To all whom it may concern:*

Be it known that I, ALONZO R. MALLORY, a citizen of the United States, residing at Madison, in the county of Morgan and State of Georgia, have invented certain new and useful Improvements in Plows; and I do hereby declare the following to be a full, clear, and exact description of the invention, such as will enable others skilled in the art to which it appertains to make and use the same.

This invention consists in certain improvements in the construction of plows, the invention having special reference to plow points and turners and their connections and attachments, as hereinafter set forth.

In the accompanying drawings, Figure 1 represents a perspective view of my straight shovel or scooter and point therefor attached to the frame or foot. Fig. 2 represents an under side perspective view of the frame and landside. Fig. 3 is a vertical section of the foot or frame and straight shovel or scooter and point therefor. Fig. 4 represents a perspective view of my improved double turner and point therefor. Fig. 5 is a similar view, partly broken away, of a single turner and point therefor constructed according to my invention.

The clod-turner and plow-point receiving frame or foot 1 consists of a casting, 2, having a diamond-shaped front end, 3, a downwardly and outwardly flaring upper front face, 4, to receive and fit the concaved under side, respectively, of the removable plow-point and the lower portion of the turner, and a rearwardly and upwardly extending curved portion, 5, to receive and fit the rear under face of the turner. Transverse holes 6 7 8 extend through this frame to receive bolts 9, removably connecting thereto, respectively, the points, turners, and plow-stock. From the forward portion of the frame and on each side thereof extend vertically downward side flanges or wings, 10, whose bottom edges are straight, and with the bottom face of the diamond-shaped point 3 rest upon the ground and slide therealong in use.

On the under side of the foot portion of the frame 1 is formed a stepped recess, 11, within which the front end, 12, of the landside 13 rests, and to which it is removably secured by the bolt 9, connecting the turner and frame together. This landside has removably secured to its under face and at the rear thereof, by a screw, 14, a slab, 15, of a thickness to insure the plow and frame points resting normally upon the ground at a sufficient angle to readily penetrate the ground as the plow is drawn forward. The front end of this slab is beveled, as shown at 16, to admit of its sliding easily over the ground.

17 represents a recess to receive, in conjunction with the forward recess, 18, in the bottom of the foot, a locking-plate, 19, which is removably secured to the foot by a screw, 20, and has slots 21 therein, which, when said plate is in position, receive the bolt-securing nuts 22 and hold the same from turning.

When it is desired to remove either the point or the turner or spreader for the substitution thereof of others or for other purposes, the screw 20 is withdrawn and the locking-plate 19 removed from locking contact with the nuts, whereupon said nuts can be loosened and they and the bolts withdrawn and either or both of the attachments removed. Such attachments can readily be secured in position by a reversal of the operation just described.

I will now proceed to describe specifically the construction of earth-turners and points which are adapted to be removably and interchangeably secured in position on the foot or frame 1, and which are shown in the drawings.

23 represents my improved double turner. This, as shown, is formed with outwardly and downwardly flaring side wings, 24, gradually sloping in concave form on their upper faces, as shown at 25, and having a sharp central rib or ridge, 26. By thus forming the double turner with a sharp central longitudinal rib or projection, 26, ease of draft and readiness of penetration are assured. By forming the wings concaved, as at 25, not only is easy draft and penetration assured, but the earth will thereby be effectively scooped up and thrown or turned to each side. By this construction of double turner I in effect have two plows in one, which is very useful for opening furrows for compost and plowing up stalks—especially cotton-stalks—as by means of this construction I am able to accomplish with one furrow that which usually requires two. The sharp center rib or ridge relieves the resistance of the breaking soil, renders the draftstrain on the team less, and renders the breaking of the ground easier. The curvature of the wings not only turns the earth easier, but also turns it to a further roll than the ordinary turning-plow.

27 represents a half-diamond-shaped plow-point adapted for use in conjunction with the double turner just described. This point has similar curved wings, 28, and a bevel-shaped beak or earth-penetrating point, 29, at its extreme front end. The bevel shape of the beak insures the plow-point entering the ground with extreme ease and readiness, while the continuous sharp center ridge, 30, and curved side wings 28 of the plow-point constitute in effect a bevel, which secures the maximum of ease of penetration of the plow and the cutting, loosening, and turning of the soil, and, in conjunction with the sharp center ridge and curved side wings of the double turner, secures a continuous ready breaking and turning of the soil from the time the point 28 enters therein.

31 represents a bolt-hole extending transversely through the point near its upper end, through which one of the bolts 9 is passed to removably connect said point and the foot 1, while 32 represents a similar bolt-hole for a similar purpose in the double turner.

33 represents a straight shovel or scooter, which is removably attached to the foot 1 by bolt 9, passed through the transverse hole 34. This is designed as a substitute in suitable cases for the double turner. It is of the same general construction as said double turner, except that the side wings 35 are of less width and terminate more abruptly, or rather extend at a greater vertical angle, than do the side wings 24. With this straight shovel—or scooter—the point 27, heretofore described, may be used.

36 represents a single turner, which is removably attached, in substitution of either the double turner or the scooter or straight shovel, to the frame 1 by a bolt, 9, passed through the hole 37. This single turner has on one side a curved wing, 38, and central sharp rib, 39, of the same shape and construction as the wings and rib heretofore described, and having the same characteristics and advantages as those heretofore described. Extending vertically from the opposite side of the central rib, 39, is an outwardly-curved or rounded plate, 40, which insures the easy draft in use. In connection with this single turner I use a plow-point, 41, which I denominate a "half-diamond" point. This is of similar construction to the point 27, heretofore described, except that it is divided longitudinally on the line of the central sharp rib, and, instead of having two concaved side wings, has but one thereof, the other side wall being curved or rounded outwardly, as shown, it being in effect of practically the same general contour superficially as that of the single turner.

It will be noticed that in all the forms of soil-turners and points illustrated they each have a sharp front, which is presented to the soil for the purpose of readily penetrating and breaking the same, and concaved side wings for turning and rolling the soil and securing ease of draft and of turning.

What I claim is—

1. A plow comprising the customary standard and draft appliances, a foot adapted to connect with the customary plow-standard, and having a curved upper or front portion adapted to independently receive and connect therewith a soil-turner and a point, an independent soil-turner and a point, each adapted to fit said foot and be independently connected thereto, said point having a central bevel-shaped beak, as explained, a landside secured at its front end to said foot, and a bevel-ended slab removably connected to the rear under face of said landside, substantially as set forth.

2. A plow comprising the customary standard and draft appliances, a soil-turner having an upwardly-projecting longitudinal rib on its upper face, a concaved side wing or wings, and at its front end a bevel-shaped beak, a foot having at its upper end a transverse bolt-hole for the attachment of the plow-standard and at its lower portion similar bolt-holes for the connection thereto, respectively, of the soil-turner and point, said foot also having depending side wings and a recessed base portion, a landside adapted to fit within the recessed base portion of the foot and having a recessed front end, and a nut-locking plate adapted to fit within said recess in the landside, substantially as set forth.

3. The foot or frame herein described, having a curved upper portion provided with bolt-holes for removably and independently connecting thereto, respectively, a plow-standard, soil-turner and point, depending side wings, and a recessed base portion, in combination with a landside adapted to fit and be secured within the recessed base of said foot, and a slab having a beveled front end and removably secured to the under face of the rear end of said landside, substantially as set forth.

4. The combination, with the foot or frame herein described, having a recessed base portion, of a landside having a recessed front end, a slotted nut-locking plate adapted to fit the recessed front end of said landside and the recess or step in the base of the foot, and a slat removably secured to the under face of the rear end of the landside, substantially as set forth.

In testimony whereof I affix my signature in presence of two witnesses.

ALONZO R. MALLORY.

Witnesses:
J. E. GODFREY,
E. W. BUTLER.